United States Patent [19]

Thomas et al.

[11] Patent Number: 4,968,097
[45] Date of Patent: Nov. 6, 1990

[54] ELEVATABLE DUMP BOX CARRIER WITH TILT FRAME AND ABUTTABLE REAR LATCH

[75] Inventors: Dennis R. Thomas; William L. LaBerdia, both of Brimfield, Ill.

[73] Assignee: Kress Corporation, Brimfield, Ill.

[21] Appl. No.: 389,708

[22] Filed: Aug. 3, 1989

[51] Int. Cl.⁵ .............................................. B60P 1/64
[52] U.S. Cl. ................................. 298/22 R; 414/498; 298/11
[58] Field of Search ............... 414/498, 476, 420, 495, 414/421; 298/22 R, 11

[56] References Cited

U.S. PATENT DOCUMENTS

| | | | |
|---|---|---|---|
| 4,026,430 | 5/1977 | Kress | 414/420 |
| 4,071,274 | 1/1978 | Dalton et al. | 414/498 X |
| 4,474,526 | 10/1984 | Gevers | 414/498 X |

FOREIGN PATENT DOCUMENTS

| | | | |
|---|---|---|---|
| 0016934 | 1/1983 | Japan | 414/498 |
| 0207746 | 8/1988 | Japan | 414/498 |

*Primary Examiner*—Frank E. Werner
*Assistant Examiner*—James T. Eller, Jr.
*Attorney, Agent, or Firm*—Leydig, Voit & Mayer

[57] ABSTRACT

A carrier for lifting, transporting and dumping a large load box or the like is provided including a wheeled trailer having a plurality of frame members and a forwardly projecting tongue for pivotal connection to a tractor. A first hydraulic cylinder is provided for raising and lowering the trailer frame with respect to the trailer wheels. A pair of laterally spaced jaw members are secured to the rear cross frame member of the trailer to receive transverse hinge pins secured to the underside of the load box adjacent its rear end and a latch plate is provided to lock the transverse hinge pins in the jaws. A tilt frame is pivotally pinned to the rear cross frame member about a tilt axis coaxial with the hinge pins when they are locked in the jaws and a second hydraulic cylinder interconnects the forward end of the tilt frame for pivotally raising the tilt frame and the load box about their coaxial pivot pins whereby the forward end of the load box is elevated first into transport position and, when the second cylinder is further extended, into full dump position. Abutting surfaces on the latch plates and the rear underside of the load box prevent the tendency for the load box to tilt further as the load is discharged rearward of the load box hinge pins.

5 Claims, 3 Drawing Sheets

ELEVATABLE DUMP BOX CARRIER WITH TILT FRAME AND ABUTTABLE REAR LATCH

This application is an improvement over our companion application Ser. No. 389,316 also filed Aug. 3, 1989 and entitled ELEVATABLE DUMP BOX CARRIER WITH TILT FRAME AND REAR LATCH.

FIELD OF THE INVENTION

The present invention relates generally to heavy duty carriers and more particularly concerns a carrier for lifting, transporting and dumping a large load box, or the like, optionally having an associated supporting stand.

BACKGROUND OF THE INVENTION

In many heavy industries it is desirable to employ large box-like load containers for receiving and temporarily storing raw materials or intermediate products for later processing or for subsequent delivery to other locations. Such load containers may have a capacity of several dozen metric tons or even more and are often provided with integral legs or associated stands and frames for supporting the containers on the ground or plant floor both when the containers are empty and out of use and when they are filled and temporarily storing material. Often a heavy duty carrier is provided for lifting and transporting such load containers from place to place.

One prior art device of this general nature is the Scrap Bucket Carrier disclosed in U.S. Pat. No. 4,618,307, which issued to the same assignee as the present application. In that patent, a heavy duty carrier is shown for lifting and transporting a scrap bucket or the like supported in a legged stand. The carrier includes a trailer with a gooseneck-like member connected to a two-wheeled tractor. A hydraulic cylinder on the tractor operates through a parallelogram linkage to raise and lower the trailer gooseneck and thus the forward portion of the trailer. One or more additional hydraulic cylinders interconnect the rear of the trailer frame and the members on which the trailer wheels are mounted for raising and lowering the rear portion of the trailer.

Also in the aforementioned patent, the stand is formed with a generally rectangular frame with rigid legs depending from the four corners thereof. A scrap bucket with a clam-shell opening bottom is supported in the stand and the carrier trailer may be lowered and backed up between the legs and under the frame. When the carrier trailer is elevated the stand and the bucket are picked up for transport to another location. The bucket is provided with a large bail handle which, with the aid of a separate crane or the like, permits the bucket to be lifted out of the stand and repositioned for discharging the contents by opening the clam-shell bottom.

Another general type of heavy duty carrier in the prior art is the kind of ladle or slag pot carrier disclosed in U.S. Pat. No. 4,624,618 (or the patents to Kress cited therein) where a large ladle or pot is picked up by a cradle pivotally mounted on the carrier trailer and the cradle is swingable in an upward and rearward direction in order to tilt the ladle and thereby dump its contents. Such carriers have been specifically designed to pick up, transport, dump and set down ladles and pots and, in general, are not suitable for use in handling other types of bulk containers such as, for example, dump boxes.

OBJECTS AND SUMMARY OF THE INVENTION

It is the primary aim of the present invention to provide heavy duty carrier having separate mechanisms for elevating the front and rear portions of the load supporting trailer with a rear clamp mechanism for pivotally securing a dump box to the trailer and a separate tilt frame interposed between the trailer and the dump box and with the tilt frame pivotally mounted on the rear of the trailer about an axis coaxially aligned with the axis of the rear clamp mechanism.

In carrying out the invention, a carrier for lifting, transporting and dumping a large load box or the like is provided including a wheeled trailer having a forwardly projecting tongue for pivotal connection to a tractor, a central longitudinal frame rigidly connected to the tongue and a rear cross member rigidly connected to the central frame member. A cross tube for journalling the trailer wheels is attached to a support arm pivotally connected at one end to one of the trailer frame members and rigidly connected at the other end to the cross tube and a first hydraulic cylinder interconnects the cross tube and another one of the trailer frame members for swinging the support arm about its pivotal connection so as to raise and lower the rear end of the trailer frame member with respect to the trailer wheels. A pair of laterally spaced jaw members are secured to the rear cross member and open rearwardly thereform to receive transverse hinge pins secured to the underside of the load box adjacent its rear end, a latch plate is pivotally secured to the structure of each of the jaws and a cylinder is provided for pivoting the latch plates to lock the transverse hinge pins in the jaws. A tilt frame is pivotally pinned to the rear cross frame about a tilt axis coaxial with the hinge pins when they are locked in the jaws by the latch plates and another hydraulic cylinder interconnects the forward end of the tilt frame for pivotally raising the tilt frame and the load box about their coaxial pivot pins whereby the forward end of the load box is elevated into dumping position. This same hydraulic cylinder and the tilt frame also raise the forward end of the dump box into transport position. When the dump box is fully raised the overhanging rear tip abuts the latch mechanism.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
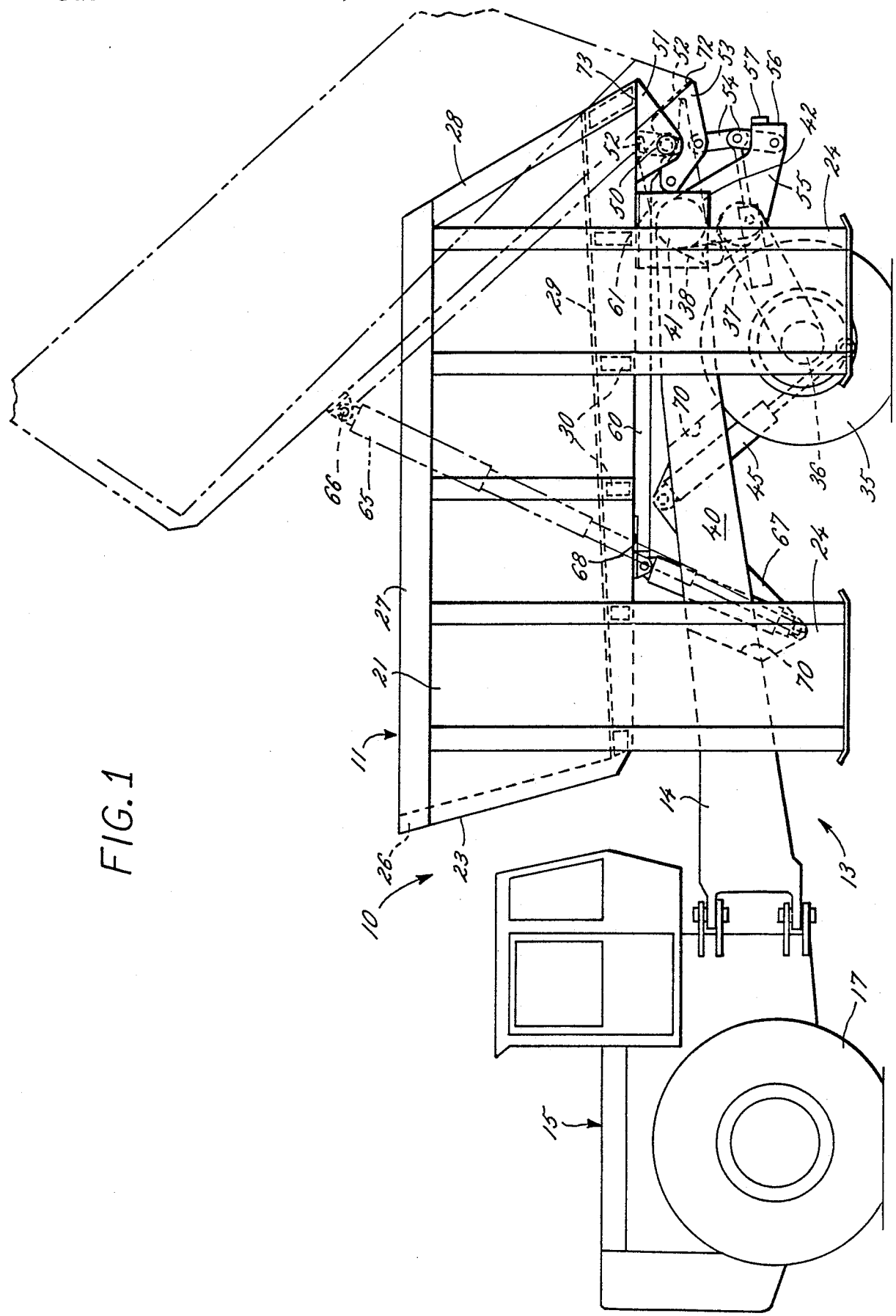
FIG. 1 is a side elevation of the elevatable dump box carrier with tilt frame and rear latch mechanism of the present invention showing the dump box in transport position in solid lines and showing the dump box in fully dumped position in phantom lines.

Turning now to the drawings, there is shown in FIG. 1 a heavy duty carrier 10 for lifting, transporting and dumping a large container such as a dump box 11 or the like. The carrier 10 includes a trailer 13 with a forwardly projecting member 14 connected to a suitable prime mover such a a two-wheeled tractor 15. The tractor 15 and trailer 13 can be turned relative to one another by any suitable and well known means such as, for example, steering actuators located on either side of the forwardly projecting tongue member 14 and connected to the tractor 15.

The dump box 11 (or other container) is generally rectangular in shape with reinforced generally vertical side walls 21 and 22 and, in the illustrated embodiment, an upwardly and forwardly inclined front wall 23. The dump box 11 may be left open at the rear or optionally may be provided with a tailgate (not shown) pivotably mounted at its upper end to the side walls 21 and 22. In the preferred embodiment, the dump box 11 is provided with four depending legs 24, one adjacent each corner of the box 11, for supporting the box and its contents on the ground or a prepared surface such as a factory floor or parking lot. It will be understood from FIGS. 1-3 that each leg 24 may be formed having a generally hollow box section with relatively long vertical and longitudinal dimensions compared to its relatively narrow transverse dimension. Preferably, the outer surfaces of the legs 24 do not exceed the overall width of the dump box 11.

In the illustrated embodiment, the front, top and rear edges of the side walls 21, 22 of the dump box 11 are reinforced with suitable box-sections 26, 27 and 28, respectively, and the floor 29 of the dump box 11 is supported on box-like reinforcing beams 30 (shown in dash-lines in the drawings). It will be understood, of course, that the dump box 11 and supporting legs 24 may be made with other shapes and constructions without departing from the present invention.

For supporting the trailer 13, a plurality of ground-engaging wheels 35 are provided. In the illustrated embodiment, the wheels 35 are arranged as two sets of dual wheels, with one set adjacent each side of the trailer. Preferably, the outboard wheel of each set does not extend beyond the width of the trailer 13 as defined by the ends of the rear cross frame 41. The wheels 35 are journalled on conventional bearing and axle assemblies (not shown) which are carried on a cross tube 36. In the illustrative embodiment, the cross tube 36 is rigidly connected to a trailing arm assembly 37 pivotally connected at its rearward end to laterally spaced brackets 38 depending from the underside of the rear cross member 41. Preferably, the ends of the rear cross member 41 carry rear side frame elements 42 for supporting the rear end of the load box 11 in transport position (see FIG. 1).

In accordance with one aspect of the present invention, the trailer 13 may be lowered so that it may be backed in under the dump box 11 between the supporting legs 24 (see FIG. 2) and then the trailer may be elevated to pick up the dump box 11 and lift the legs 24 off the ground for transport purposes (see FIG. 1). To elevate the trailer 13, a first hydraulic cylinder 45 is provided interconnecting the cross tube 36 and the main frame member 40 for swinging the trailing arm assembly 37 about its pivotal connection to the brackets 38 so as to raise and lower the rear end of the trailer 13 with respect to the trailer wheels 35.

Figure 2:
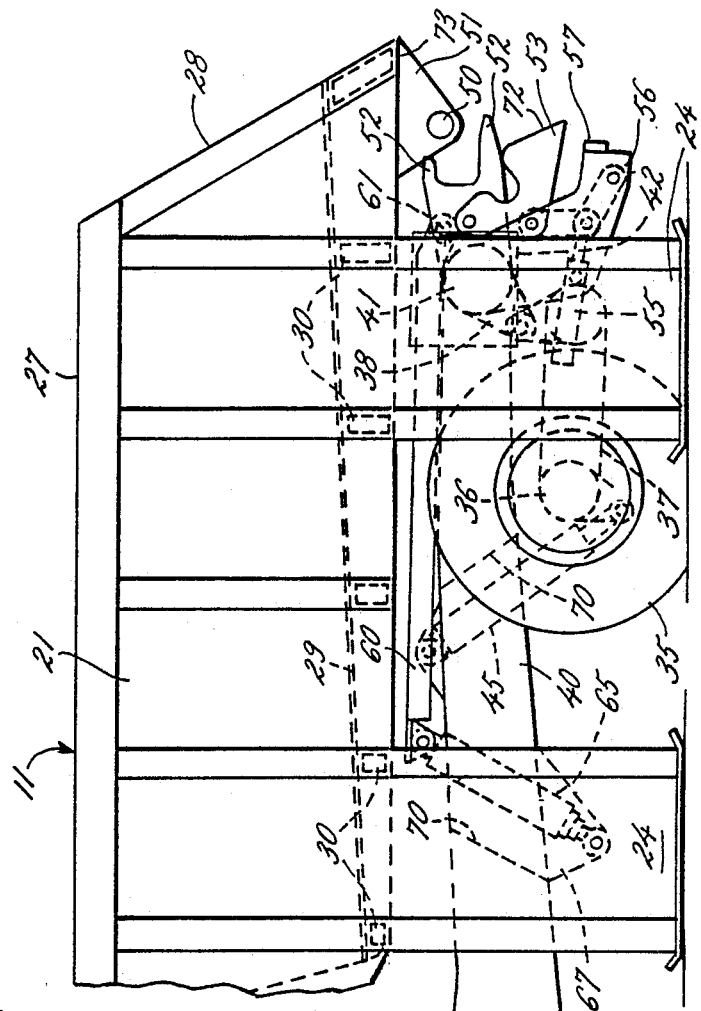
FIG. 2 is a side elevation, similar to FIG. 1, showing the carrier trailer lowered to pick up the dump box and lift the legs off the ground.
Figure 3:
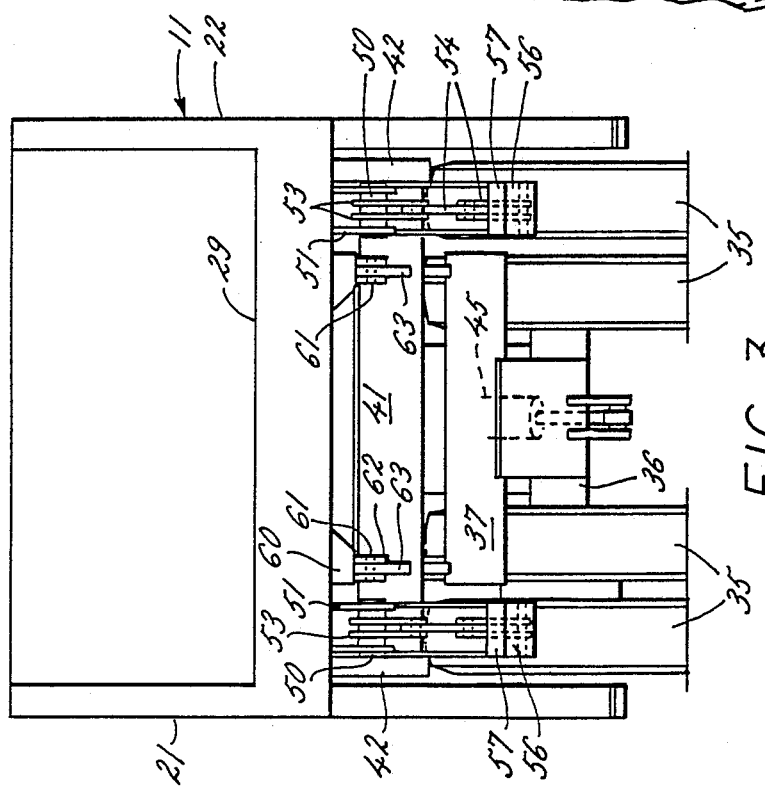
FIG. 3 is a rear end view of the carrier trailer.

Pursuant to another feature of the invention, the trailer 13 is provided with means for clamping the dump box 11 on the trailer for transport and subsequent dumping operations. To this end, a pair of laterally spaced, transverse hinge pins 50 are carried by depending mounting brackets 51 adjacent the rear end of the dump box 11 and a pair of rearwardly opening jaw members 52 are rigidly secured to the rear cross member 41. As shown in FIG. 2, the jaw members 52 on the trailer 13 are disposed to receive the hinge pins 50 on the dump box 11 as the trailer is backed up beneath the dump box 11.

To lock the hinge pins 50 in the jaws 52, a pair of generally C-shaped latch plates 53 are pivotally mounted on the supporting structure of each of the jaw members 52. When the latch members 53 are pivoted upwardly into the position shown in FIG. 1, the hinge pins 50 are captured and locked in the openings of the jaws 52. In the preferred embodiment, the latch members are pivoted by means of a toggle linkage 54 operated by a pneumatic cylinder or the like 55 which may be anchored between a pair of spaced legs 56 carried on the rear cross member 41. In FIG. 2, the cylinder 55 is shown in retracted position with the latch plates 53 swung down into open position and in FIG. 1 the cylinder 55 is shown in its extended position with the latch plates 53 swung up into locking position. In the preferred embodiment, the toggle linkage 54 is extended into slightly overcenter position when the cylinder 55 is extended and a stop 57 is provided between the legs 56 to limit the overcenter travel of the links 54.

In keeping with another important aspect of the present invention, provision is made for dumping the box 11 carried on the trailer 13. Pursuant to this feature, a tilt frame 60 is hinged at its rear end on pins 61 inserted through appropriate holes in spaced legs 62 on the frame 60 and ears 63 rigidly secured to the rear cross member 41 on the trailer 13. In the preferred embodiment, the pivot pins 61 of the tilt frame 60 are disposed coaxially with the hinge pins 50 of the dump box 11. Thus, as the tilt frame 60 is raised, both it and the dump box 11 are pivoted about a common axis.

For raising and lowering the tilt frame 60, a multi-stage hydraulic cylinder 65 is connected to the forward end of the tilt frame 60 by a suitable connecting pin 66 or the like. In the illustrated embodiment, the other end of the lift cylinder 65 is secured to the lower end of an arm 67 rigidly secured to the mainframe member 40 of the trailer 13. In FIG. 2, the lift cylinder 65 is shown in its retracted position and the tilt frame is disposed above and substantially parallel to the central frame member 40 of the trailer 13.

Figure 4:
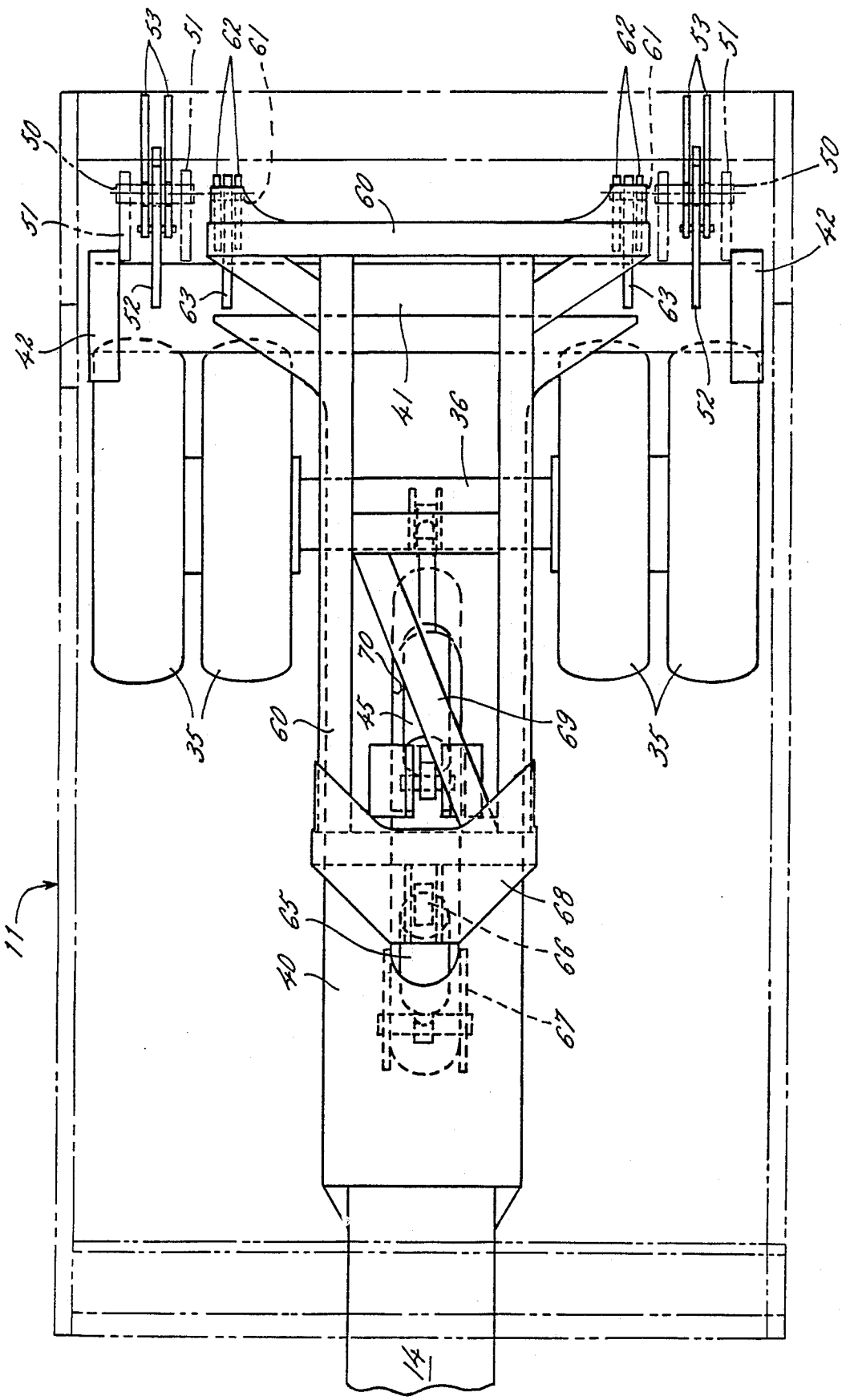
FIG. 4 is an enlarged, fragmentary, plan view of the carrier trailer with the dump box illustrated in phantom lines.

As shown in FIG. 4, the tilt frame 60 is generally rectangular in shape and extends forwardly from its pivot pins 61 to between the inboard trailer wheels 35. Preferably, the forward end of the tilt frame 60 is provided with a substantially flat lift plate 68 which is disposed to engage the lower surface of one of the cross beams 30 supporting the floor 29 of the dump box 11. The tilt frame 60 may also be suitably reinforced by diagonal cross bracing 69 to prevent lateral deflection as the tilt frame is lifted to dump the dump box 11. It will also be seen that the wide spacing of the hinge pins 50 on the dump box which are latched into the jaws 52 on the trailer 13 substantially prevent twisting of the box 11 as it is dumped.

In keeping with another aspect of the invention, the lift cylinder 65 and tilt frame 60 are also utilized to lift the dump box 11 from its free standing position supported on the legs 24 (see FIG. 2) to the transport position as shown in the solid line illustration of FIG. 1. It will also be seen in FIG. 4 that the lift cylinders 45 and 65 are both arranged so as to project upwardly through a common elongated opening 70 in the central portion of the mainframe member 40. Thus, a very simple, and compact arrangement is provided for both elevating the dump box 11 for transport and for subsequently raising the dump box 11 to the full dump position.

It is yet another feature of the present invention that the rear latch plates 53 are formed with an upper surface 72 which is engaged by and abuts the lower surface 73 of the rear end of dump box 11 when it is raised to the full dump position (see FIG. 1). The advantage of this abutting arrangement of the latch plates is that it resists the further rearward tilting movement of the dump box 11 about its hinge pins 50 as the load slides down the dump box floor 29 rearward of the location of the hinge pins. Rather the abutting surfaces are located at the extreme rear end of the dump box 11 and there is essentially no overturning moment located to the rear of this engagement. Thus there is no tendency for the dump box to continue to tilt as the load is discharged.

From the foregoing, it will be seen that a heavy duty carrier is provided for elevating, transporting and dumping a heavy container such as a dump box or the like. The trailer lock mechanism comprising the open jaw members 52 and pivoted lock plates 53 not only serve to lock the dump box on the trailer during transport but also journal the hinge pins 50 as the box 11 is being dumped. Furthermore the abutting surfaces on the latch plates 53 engage the rearward most portion of the dump box and prevent a further overturning moment as the load is being discharged.

We claim as our invention:

1. A carrier for lifting, transporting and dumping a large load box, comprising, in combination, a wheeled trailer having a forwardly projecting tongue for pivotal connection to a tractor, said trailer having a frame comprising a plurality of members including at least one substantially longitudinal frame member rigidly connected to the tongue and a rear cross member rigidly connected substantially perpendicular to the longitudinal frame member, a cross tube for journalling the trailer wheels, means including a support arm pivotally connected at one end to one of the trailer frame members and rigidly connected at the other end to the cross tube, a first hydraulic cylinder interconnecting the cross tube and another one of the trailer frame members for swinging the support arm about its pivotal connection so as to raise and lower the rear end of the trailer frame with respect to the trailer wheels, means including structure defining a pair of laterally spaced open jaws secured to the rear cross member and opening rearwardly therefrom for receiving transverse hinge pins secured to the underside of the load box adjacent the rear end thereof, a latch plate pivotally secured to the structure of each of the jaws, means for pivoting the latch plates for locking the transverse hinge pins in the jaws, a tilt frame pivotally pinned to the rear cross member about a tilt axis coaxial with the hinge pins when they are locked in the jaws by the latch plates, and means including a second hydraulic cylinder interconnecting one of the trailer frame members and the forward end of the tilt frame for pivotally raising the tilt frame and the load box about their coaxial pivot pins whereby the forward end for the load box is elevated to raise the load box to transport position and further extension of the second cylinder raises the tilt frame and load box to the full dump position.

2. A carrier as defined in claim 1 wherein the means for pivoting the latch plates includes a toggle linkage and a third actuator for urging the toggle linkage into overcentered position when the latch plates are pivoted to lock the transverse hinge pins in the jaws.

3. A carrier as defined in claim 2 including means for limiting the overcenter travel of the toggle linkage.

4. A carrier as defined in claim 1 wherein the latch plates are formed with an upper surface disposed to abut the rear underside of the load box when the load box is elevated to the full dump position.

5. A carrier as defined in claim 4 wherein a pair of the latch plates are pivotally mounted on each of the jaws and means including a toggle linkage and a third actuator are provided for pivoting the latch plate to their closed position.

* * * * *